(12) United States Patent
Han et al.

(10) Patent No.: US 11,858,120 B2
(45) Date of Patent: Jan. 2, 2024

(54) FORCE MEASURING SENSOR AND ROBOT INCLUDING SAME

(71) Applicants: HYUNDAI MOTOR COMPANY, Seoul (KR); KIA CORPORATION, Seoul (KR)

(72) Inventors: Hyo Seung Han, Suwon-si (KR); Muhammad Zahak Jamal, Yongin-si (KR); Ju Young Yoon, Suwon-si (KR); Sang In Park, Suwon-si Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 243 days.

(21) Appl. No.: 17/409,226

(22) Filed: Aug. 23, 2021

(65) Prior Publication Data

US 2022/0168903 A1 Jun. 2, 2022

(30) Foreign Application Priority Data

Nov. 30, 2020 (KR) .......................... 10-2020-0164976

(51) Int. Cl.
| | |
|---|---|
| *B25J 13/08* | (2006.01) |
| *G01L 5/00* | (2006.01) |
| *G06F 3/047* | (2006.01) |
| *G01L 1/14* | (2006.01) |

(52) U.S. Cl.
CPC .......... *B25J 13/085* (2013.01); *G01L 5/0061* (2013.01); *G01L 1/144* (2013.01); *G06F 3/047* (2013.01)

(58) Field of Classification Search
None
See application file for complete search history.

(56) References Cited

U.S. PATENT DOCUMENTS

| | | | | |
|---|---|---|---|---|
| 7,591,187 | B2 * | 9/2009 | Hamel | G01B 17/04 |
| | | | | 73/778 |
| 8,671,758 | B2 * | 3/2014 | Jacobsen | G01H 13/00 |
| | | | | 73/659 |
| 9,802,316 | B2 * | 10/2017 | Koselka | G01L 5/009 |
| 9,965,077 | B2 | 5/2018 | Kim et al. | |
| 2017/0075467 | A1 | 3/2017 | Kim et al. | |
| 2019/0234814 | A1 * | 8/2019 | Yoon | H01G 5/0136 |
| 2020/0212911 | A1 * | 7/2020 | Lin | H03K 17/9625 |
| 2022/0297318 | A1 * | 9/2022 | Jamal | B25J 13/08 |

FOREIGN PATENT DOCUMENTS

| | | | | |
|---|---|---|---|---|
| DE | 102015101334 A1 | * | 7/2015 | ............ G01D 5/353 |
| DE | 102014103441 A1 | * | 9/2015 | ........... A61B 5/1036 |
| JP | 3083844 B2 | * | 9/2000 | ............ G01L 1/247 |
| JP | WO2018012102 A1 | * | 4/2019 | |
| KR | 10-1723804 B | | 12/2014 | |
| KR | 10-1470160 B | | 4/2017 | |

* cited by examiner

*Primary Examiner* — Octavia Davis Hollington
(74) *Attorney, Agent, or Firm* — MORGAN, LEWIS & BOCKIUS LLP

(57) ABSTRACT

A force measuring sensor is provided. The force measuring sensor includes: a wire; a signal generator having one side fixed to one end of the wire; and a signal processor configured to convert and process an analog signal received from the signal generator into a digital signal, in which the wire is configured to penetrate an internal space formed in the signal generator, and the analog signal is generated by a change in thickness of a component of the signal generator caused by a change in tension of the wire.

13 Claims, 5 Drawing Sheets

FORCE MEASURING SENSOR AND ROBOT INCLUDING SAME

CROSS-REFERENCE TO RELATED APPLICATION

This application claims priority to and the benefit of Korean Patent Application No. 10-2020-0164976 filed on Nov. 30, 2020, the entire contents of which are incorporated herein by reference.

TECHNICAL FIELD

The present disclosure relates to a force measuring sensor having a simpler structure than that in the related art, and a robot including the same.

BACKGROUND

In general, a robot is mounted with a sensor for measuring a force applied to the robot. For example, the sensor is mounted in a robot arm of the robot. The sensor is essentially required to precisely control the robot. For example, the sensor serves to measure tension applied to a wire provided in the robot.

In the related art, generally, a force measuring sensor mounted in the robot is made of metal or plastic and provided with an additional structure for connecting the wire and the force measuring sensor. However, in the related art, because the force measuring sensor is hard due to metal or plastic and the additional structure is provided to connect the wire and the force measuring sensor, it is difficult to form a shape of the sensor, the sensor is complicated in structure, and it is difficult to miniaturize the sensor.

In addition, in the related art, the sensor is manufactured in such a way that a pair of electrodes is provided in the sensor and a dielectric material is provided between the pair of electrodes. In this case, because a pair of substrates needs to be provided to be attached to the electrodes, respectively, there is a problem in that a large amount of costs is required to manufacture the substrates and an additional circuit is required to electrically connect the substrates.

Lastly, in the related art, because the dielectric material and the electrodes, which are mounted in the sensor, are made of materials different from a material of the circuit for processing signals, there is a problem in that a contact defect frequently occurs.

SUMMARY

The present disclosure provides a force measuring sensor which has a simpler structure than that in the related art, such that the force measuring sensor may be miniaturized, costs required to manufacture the force measuring sensor may be reduced, and the force measuring sensor may have the structure with improved performance and stability.

In one aspect, the present disclosure provides a force measuring sensor including: a wire; a signal generating part having one side fixed to one end portion of the wire; and a signal processing part configured to convert and process an analog signal received from the signal generating part into a digital signal, in which the wire is provided to penetrate an internal space S formed in the signal generating part, and the analog signal is generated by a change in thickness of a component of the signal generating part caused by a change in tension of the wire.

The force measuring sensor may further include a PCB provided under the signal generating part and the signal processing part and provided to be in close contact with the signal generating part and the signal processing part.

The wire may be provided to penetrate the PCB.

The signal generating part may include an electrode provided to be in close contact with the PCB; a plate provided to be spaced apart upward from the electrode; and a dielectric layer provided between the electrode and the plate and provided to be in close contact with the electrode and the plate, and the analog signal may be generated by a change in thickness of the dielectric layer.

The wire may be fixed to a lower surface of the plate.

A pressing force applied to the dielectric layer by the plate may be changed by the change in tension of the wire, and a thickness of the dielectric layer may be changed by the change in pressing force.

The signal generating part may further include a shield part provided between the electrode and the PCB.

The electrode and the shield part may be inserted into the PCB.

An upper surface of the electrode and an upper surface of the PCB may be provided on the same plane.

Through holes may be formed in the PCB, the shield part, the electrode, and the dielectric layer, respectively, and the through holes, which are formed in the PCB, the shield part, the electrode, and the dielectric layer, respectively, may communicate with one another to form the internal space S.

The analog signal may be generated by a change in electrostatic capacity of the signal generating part.

The dielectric layer may include a conductive filler and resin.

In another aspect, the present disclosure provides a robot including: a force measuring sensor, in which the force measuring sensor includes: a wire; a signal generating part having one side fixed to one end portion of the wire; and a signal processing part configured to process an analog signal received from the signal generating part into a digital signal, in which the wire is provided to penetrate an internal space S formed in the signal generating part, and the analog signal is generated by a change in thickness of a component of the signal generating part caused by a change in tension of the wire.

The robot may further include a robot arm, in which the force measuring sensor is provided on an end portion of the robot arm.

According to the present disclosure, it is possible to provide the force measuring sensor which has a simpler structure than that in the related art, such that the force measuring sensor may be miniaturized, costs required to manufacture the force measuring sensor may be reduced, and the force measuring sensor may have the structure with improved performance and stability.

DRAWINGS

DETAILED DESCRIPTION

Hereinafter, a force measuring sensor and a robot in some forms of the present disclosure will be described with reference to the drawings.

Force Measuring Sensor

Figure 1:
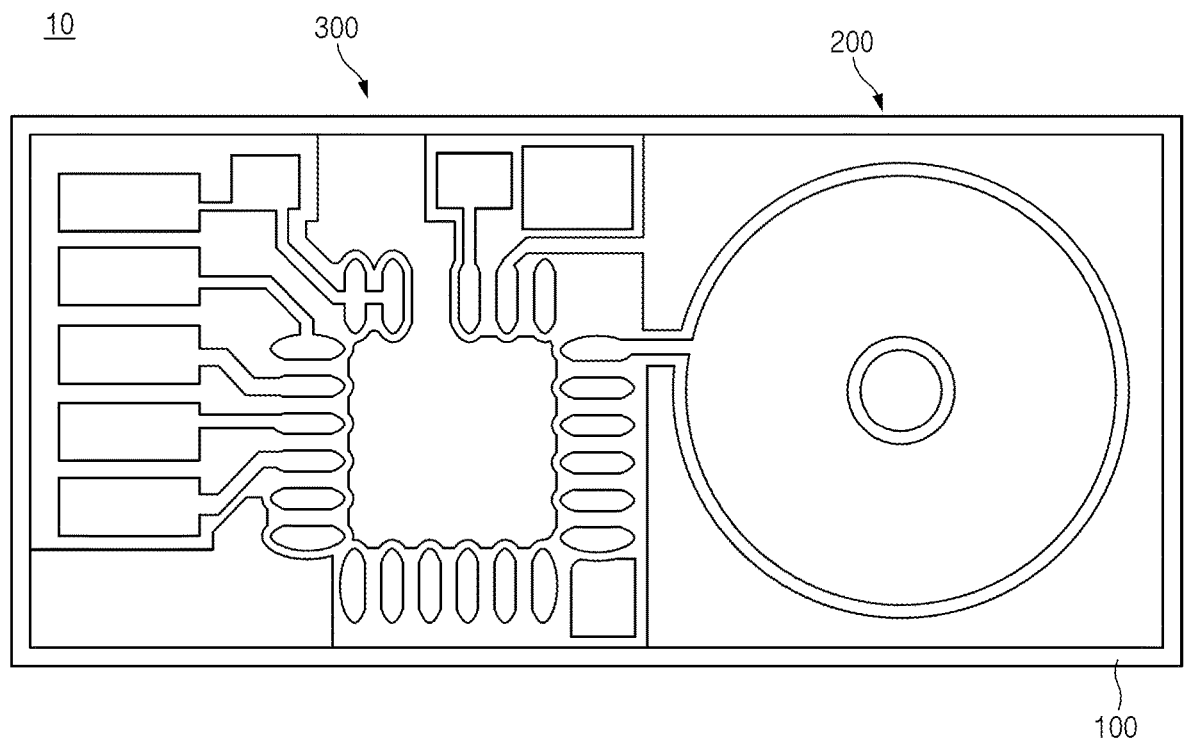
FIG. 1 is a top plan view illustrating a force measuring sensor in one form of the present disclosure.
Figure 2:
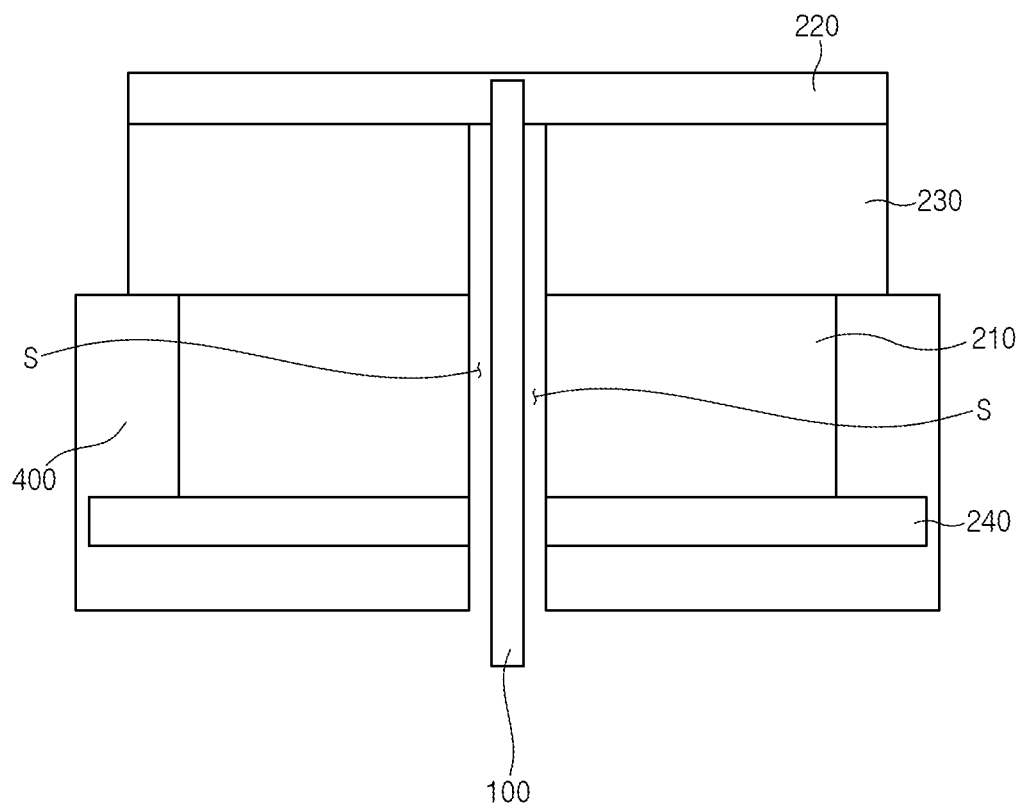
FIG. 2 is a cross-sectional view illustrating a signal generating part of the force measuring sensor and a layered structure of a PCB in one form of the present disclosure.

FIG. 1 is a top plan view illustrating a force measuring sensor in some forms of the present disclosure, and FIG. 2 is a cross-sectional view illustrating a signal generating part of the force measuring sensor and a layered structure of a PCB in some forms of the present disclosure.

As illustrated in FIGS. 1 and 2, a force measuring sensor 10 according to the present disclosure may include a wire 100, a signal generating part 200 having one side fixed to one end portion of the wire 100, and a signal processing part 300 configured to convert and process an analog signal received from the signal generating part 200 into a digital signal. In this case, the digital signals converted by the signal processing part 300 may be 16-bit data, but the type of data is not limited thereto.

Tension of the wire 100 may be changed by power provided from a power source such as an actuator. For example, as described below, the wire 100 may be a tendon provided in a robot arm in order to operate the robot arm.

Continuing to refer to FIG. 2, an internal space S may be formed in the signal generating part 200, and the wire 100 may be provided to penetrate the internal space S.

As described above, the wire 100 may be configured such that the tension of the wire 100 is changed by the power provided from the power source such as the actuator. When the tension of the wire 100 is changed, a force applied to the signal generating part 200 to which the wire 100 is fixed is also changed. For example, as illustrated in FIG. 2, in a case in which the wire 100 is fixed to a lower surface of a component 220 of the signal generating part 200, a magnitude of a force applied downward to the signal generating part 200 by the wire 100 is also changed.

The force measuring sensor 10 according to the present disclosure may be configured to generate the analog signal in response to the change in tension of the wire 100. In more detail, according to the present disclosure, the analog signal may be generated by a change in thickness of the component of the signal generating part 200 caused by the change in tension of the wire 100. That is, according to the present disclosure, i) the change in tension of the wire 100, ii) the change in force applied to the signal generating part 200 by the wire 100, iii) the change in thickness of the component of the signal generating part 200, and iv) the generation of the analog signal may sequentially occur in a time series manner.

In particular, according to the present disclosure, since the wire 100 penetrates the internal space S and is fixed directly to the signal generating part 200 without a separate component, the force measuring sensor 10 may be manufactured without a separate fixing member, such that the structure of the sensor may be simplified, and the miniaturization of the sensor may be implemented.

Continuing to refer to FIG. 2, the force measuring sensor 10 according to the present disclosure may further include a PCB 400 provided under the signal generating part 200 and the signal processing part 300 and configured such that the signal generating part 200 and the signal processing part 300 are in close contact with the PCB 400. For example, the signal generating part 200 and the signal processing part 300 may be in close contact with an upper surface of the PCB 400.

In this case, the wire 100 may be provided to penetrate the PCB 400. Therefore, the wire 100 may penetrate the internal space S of the signal generating part 200 via the PCB 400, and then may be fixed to the lower surface of the component 220 of the signal generating part 200.

Meanwhile, the signal generating part 200 of the force measuring sensor 10 according to the present disclosure may have a structure in which a plurality of components is laminated. In more detail, the signal generating part 200 may include an electrode 210 provided on an upper portion of the PCB 400 and provided to be in close contact with the PCB 400, a plate 220 provided to be spaced apart upward from the electrode 210, and a dielectric layer 230 provided between the electrode 210 and the plate 220 and provided to be in close contact with the electrode 210 and the plate 220.

According to the present disclosure, an assembly of the electrode 210, the plate 220, and the dielectric layer 230 may function as a kind of capacitor. That is, the electrode 210 and the plate 220 may be charged with electric charges with the dielectric layer 230 interposed therebetween. Hereinafter, the quantity of charged electric charges is referred to as a charge quantity.

Meanwhile, the charge quantity Q of the capacitor is not only proportional to a potential difference between polar plates, that is, a potential difference V between the electrode 210 and the plate 220, but also proportional to an electrostatic capacity C of the capacitor. In addition, the electrostatic capacity is proportional to an area of the polar plate, that is, an area of the electrode 210 and an area of the plate 220, whereas the electrostatic capacity is inversely proportional to an interval between the polar plates, that is, an interval between the electrode 210 and the plate. In this case, it can be seen that the interval between the electrode 210 and the plate 220 corresponds to a thickness of the dielectric layer 230.

The analog signal generated by the signal generating part 200 of the force measuring sensor 10 in some forms of the present disclosure may be generated by a change in thickness of the dielectric layer 230. In more detail, in some forms of the present disclosure, the analog signal may be generated by a change in electrostatic capacity of the signal generating part 200 caused by the change in thickness of the dielectric layer 230.

That is, in some forms of the present disclosure, the wire 100 may be fixed to a lower surface of the plate 220. Therefore, when the tension of the wire 100 is changed, a pressing force applied to the dielectric layer 230 by the plate 220 is changed, and the thickness of the dielectric layer 230 is changed by the change in pressing force. The analog signal generated by the change in electrostatic capacity caused by the change in thickness of the dielectric layer 230 may be transmitted to the signal processing part 300.

Continuing to refer to FIG. 2, the signal generating part 200 of the force measuring sensor 10 according to the present disclosure may further include a shield part 240 provided between the electrode 210 and the PCB 400. The shield part 240 may be configured to prevent a phenomenon in which electric charges are inadvertently stored in regions other than the capacitor configured by the electrode 210, the plate 220, and the dielectric layer 230. For example, the shield part 240 may be an AC shield for preventing the occurrence of parasitic capacitance.

Meanwhile, in some forms of the present disclosure, the electrode 210 and the shield part 240 may be inserted into the PCB 400. In this case, since the shield part 240 is provided under the electrode 210 as described above, only an upper surface of the electrode 210, between the electrode 210 and the shield part 240, may be exposed to the outside. For example, FIG. 2 illustrates a state in which the upper surface of the electrode 210 and the upper surface of the PCB 400 are provided on the same plane.

In addition, as illustrated in FIG. 2, according to the present disclosure, through holes may be formed in the PCB 400, the shield part 240, the electrode 210, and the dielectric layer 230, respectively, and the through holes, which are formed in the PCB 400, the shield part 240, the electrode 210, and the dielectric layer 230 may communicate with one another to form the internal space S. In contrast, the plate 220 may have no through hole. This is to prevent the wire 100 from being exposed to the outside.

Meanwhile, in some forms of the present disclosure, the dielectric layer 230 may include a conductive filler and resin. Therefore, the thickness of the dielectric layer 230 according to the present disclosure may be comparatively greatly changed by external force. That is, according to the present disclosure, the change in thickness of the dielectric layer 230 in accordance with the change in tension of the wire 100 may be maximized, and the magnitude of the analog signal may also be increased, such that sensitivity of the force measuring sensor 10 may also be significantly improved.

Figure 3:
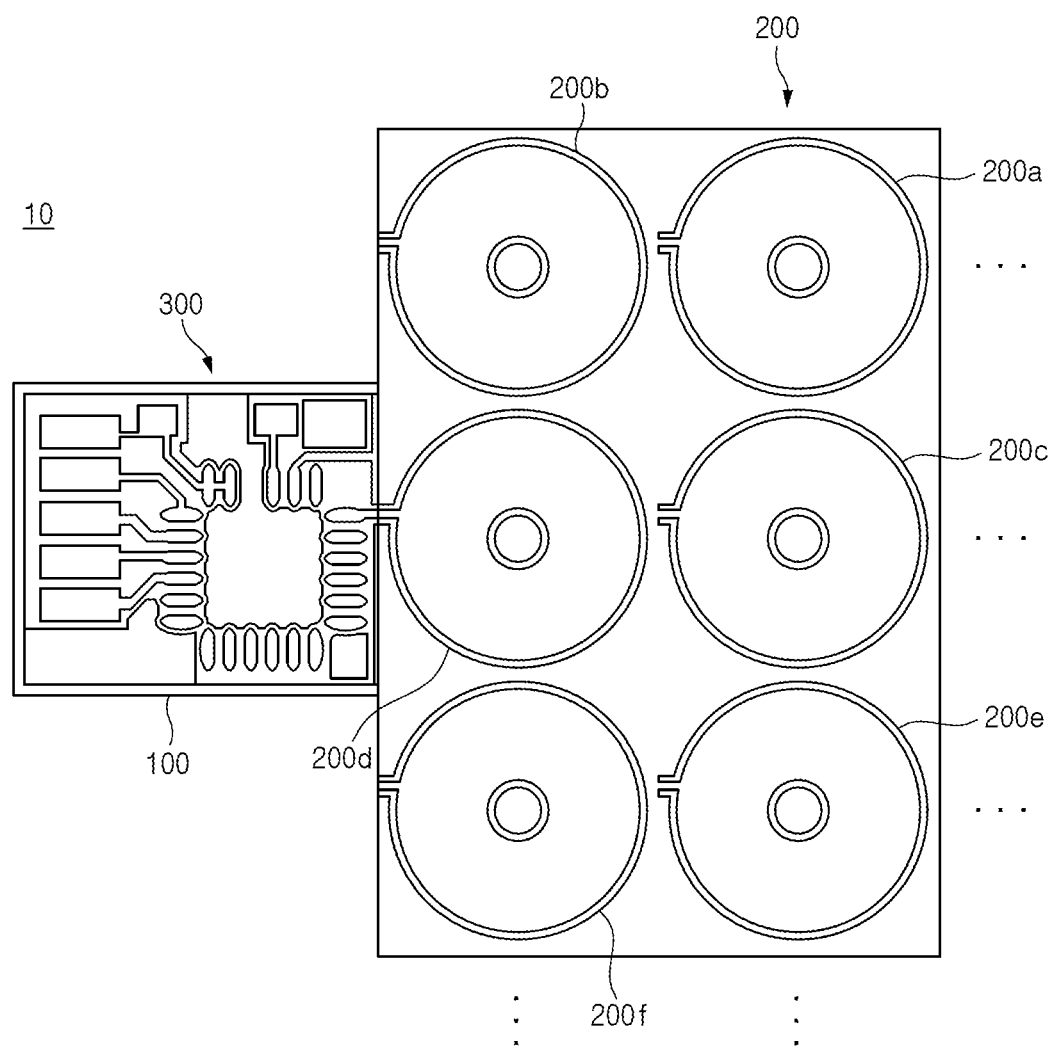
FIG. 3 is a top plan view illustrating a force measuring sensor in one form of the present disclosure.

FIG. 3 is a top plan view illustrating a force measuring sensor in some forms of the present disclosure.

As illustrated in FIG. 3, the force measuring sensor 10 may have a plurality of signal generating parts 200. For example, FIG. 3 illustrates a state in which the force measuring sensor 10 has six signal generating parts 200a, 200b, 200c, 200d, 200e, and 200f.

As illustrated in FIG. 3, in the case in which the plurality of signal generating parts is provided, a plurality of wires is also provided, and as a result, it is possible to measure changes in tension of the plurality of wires provided in the single force measuring sensor 10. Meanwhile, according to another example of the present disclosure, the plurality of signal generating parts 200a, 200b, 200c, 200d, 200e, and 200f and the signal processing part 300 may be mounted on the single PCB 400.

Robot

Figure 4:
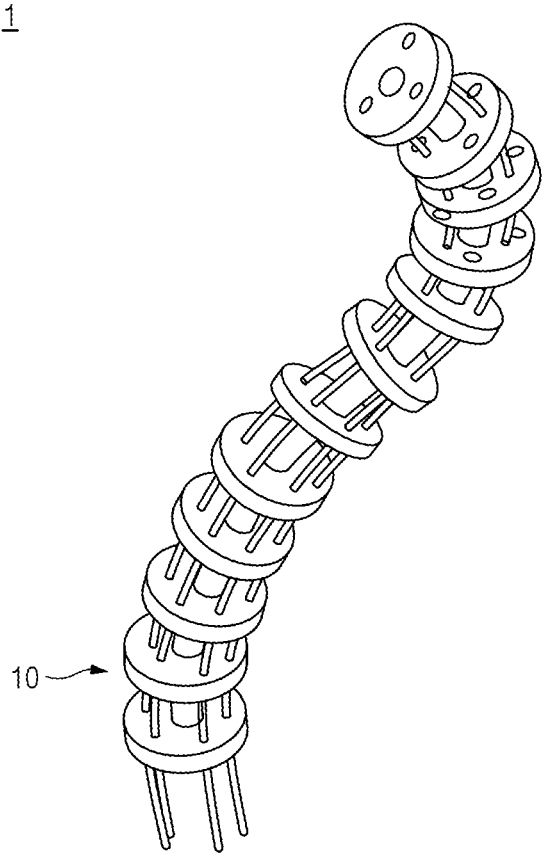
FIGS. 4 and 5 are perspective views illustrating exemplary structures of robot arms of robots in which the force measuring sensor in one form of the present disclosure is mounted.
Figure 5:
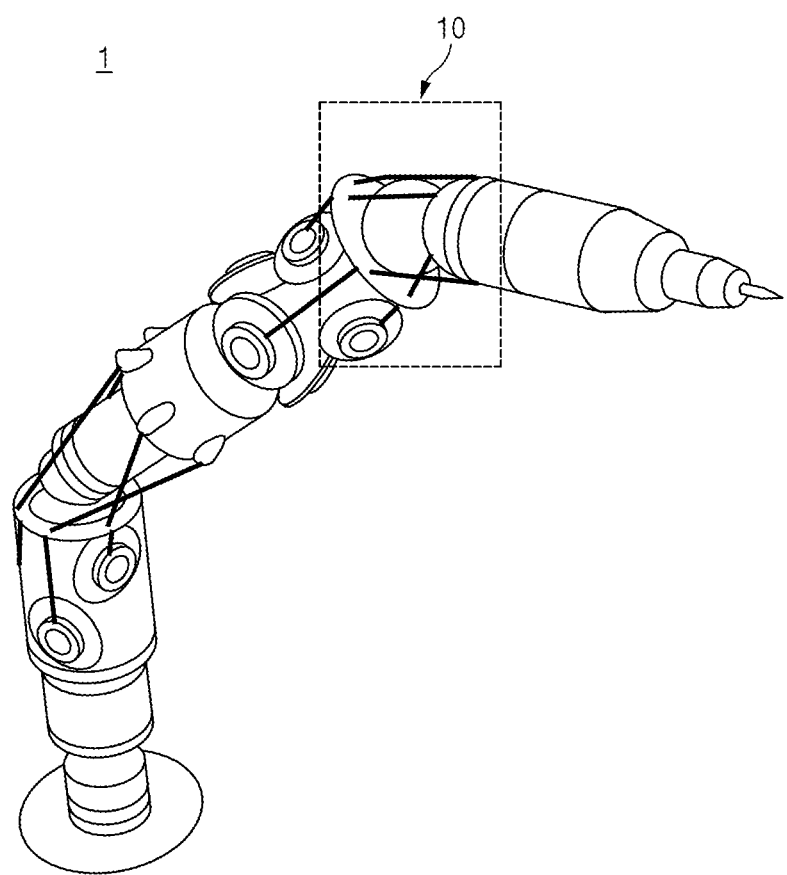

FIGS. 4 and 5 are perspective views illustrating exemplary structures of robot arms of robots in which the force measuring sensor in some forms of the present disclosure is mounted.

Referring to FIGS. 1 to 5, a robot in some forms of the present disclosure may include the force measuring sensor 10. In this case, the force measuring sensor 10 according to the present disclosure may include the wire 100, the signal generating part 200 having one side fixed to one end portion of the wire 100, and the signal processing part 300 configured to process an analog signal received from the signal generating part 200 into a digital signal. In addition, the wire 100 may be provided to penetrate the internal space S formed in the signal generating part 200. The analog signal may be generated by a change in thickness of the component of the signal generating part 200 caused by the change in tension of the wire 100. The component may be the dielectric layer 230 as described above. Meanwhile, the above-mentioned description of the force measuring sensor 10 according to the present disclosure may also be equally applied to the robot according to the present disclosure.

In more detail, the robot in some forms of the present disclosure may include a robot arm 1, and the force measuring sensor 10 may be provided on an end portion of the robot arm 1.

The wire 100 provided in the force measuring sensor 10 of the robot arm 1 in some forms of the present disclosure may be a configuration for imitating a tendon provided inside a human arm. Therefore, when the wire 100 is pulled by the power source such as the actuator, the tension of the wire 100 is increased, and thus a linkage structure of the robot arm 1 is moved.

In this case, in order to precisely control the robot arm 1, it is necessary to precisely measure the tension of the wire 100. In some forms of the present disclosure, it is possible to precisely measure the tension of the wire 100 on the basis of the analog signal generated in response to the change in thickness of the dielectric layer 230 provided in the force measuring sensor 10. Therefore, in some forms of the present disclosure, the precise control for the robot arm 1 may be implemented. For example, the robot arm 1 of the robot in some forms of the present disclosure may be a robot arm provided on a surgical robot. However, the type of robot is not limited thereto.

The present disclosure has been described with reference to the limited forms and the drawings, but the present disclosure is not limited thereto. The described forms may be carried out in various forms by those skilled in the art to which the present disclosure pertains within the technical spirit of the present disclosure and within the scope equivalent to the appended claims.

What is claimed is:

1. A force measuring sensor comprising:
   a wire;
   a signal generator, wherein one side of the signal generator is fixed to one end of the wire;
   a signal processor configured to convert and process an analog signal received from the signal generator into a digital signal,
   a printed circuit board (PCB) provided under the signal generator and the signal processor, and in close contact with the signal generator and the signal processor,
   wherein the wire is configured to penetrate an internal space formed in the signal generator, and the analog signal is generated by a change in thickness of a component of the signal generator caused by a change in tension of the wire,
   wherein the signal generator comprises an electrode in close contact with the PCB and a plate spaced apart upward from the electrode, and
   wherein the electrode is inserted into the PCB.

2. The force measuring sensor of claim 1, wherein the wire is configured to penetrate the PCB.

3. The force measuring sensor of claim 1, wherein the signal generator further comprises:
   a dielectric layer provided between the electrode and the plate and in close contact with the electrode and the plate,
   wherein the analog signal is generated by a change in thickness of the dielectric layer.

4. The force measuring sensor of claim 3, wherein the dielectric layer comprises a conductive filler and resin.

5. The force measuring sensor of claim 1, wherein the wire is fixed to a lower surface of the plate.

6. The force measuring sensor of claim 5, wherein:
   a pressing force applied to the dielectric layer by the plate is changed by the change in tension of the wire, and
   a thickness of the dielectric layer is changed by the change in the pressing force.

7. The force measuring sensor of claim 1, wherein the signal generator further comprises:
   a shield part provided between the electrode and the PCB.

8. The force measuring sensor of claim 7, wherein the shield part is inserted into the PCB.

9. The force measuring sensor of claim 8, wherein an upper surface of the electrode and an upper surface of the PCB are provided on a same plane.

10. The force measuring sensor of claim 7, wherein:
through holes are formed in the PCB, the shield part, the electrode, and the dielectric layer, wherein the through holes communicate with the PCB, the shield part, the electrode, and the dielectric layer to form the internal space.

11. The force measuring sensor of claim 1, wherein the analog signal is generated by a change in electrostatic capacity of the signal generator.

12. A robot comprising:
a force measuring sensor comprising:
a wire;
a signal generator, wherein one side of the signal generator is fixed to one end of the wire;
a signal processor configured to process an analog signal received from the signal generator into a digital signal; and
a printed circuit board (PCB) provided under the signal generator and the signal processor, and in close contact with the signal generator and the signal processor,
wherein the wire is configured to penetrate an internal space formed in the signal generator, and the analog signal is generated by a change in thickness of a component of the signal generator caused by a change in tension of the wire,
wherein the signal generator comprises an electrode in close contact with the PCB and a plate spaced apart upward from the electrode, and
wherein the electrode is inserted into the PCB.

13. The robot of claim 12, further comprising:
a robot arm, wherein the force measuring sensor is provided on one end of the robot arm.

* * * * *